United States Patent

[11] 3,624,073

| [72] | Inventors | George Francis Field<br>West Caldwell;<br>Leo Henryk Sternbach, Upper Montclair;<br>William Joseph Zally, Union City, all of N.J. |
|---|---|---|
| [21] | Appl. No. | 718,259 |
| [22] | Filed | Apr. 2, 1968 |
| [45] | Patented | Nov. 30, 1971 |
| [73] | Assignee | Hoffman-La Roche Inc.<br>Nutley, N.J.<br>Continuation-in-part of application Ser. No. 665,716, Sept. 6, 1967, now abandoned.<br>This application Apr. 2, 1968, Ser. No. 718,259 |

[54] PROCESS FOR PREPARING 5-SUBSTITUTED-1,4-BENZODIAZEPINES
3 Claims, No Drawings

[52] U.S. Cl. ..................................................260/239 BD, 260/239 BD

[51] Int. Cl. .................................................... C07d 41/08
[50] Field of Search ............................................260/239 BD

[56] References Cited
OTHER REFERENCES

Smith, Chemistry of Open-chain Organic Nitrogen Compounds, (1965), vol. 1, pp. 147- 148

Wagner et al., Synthetic Organic Chemistry (1953), pp. 45-46.

*Primary Examiner*—Alex Mazel
*Assistant Examiner*—Joseph A. Narcavage
*Attorneys*—Samuel L. Welt, George M. Gould, Jon S. Saxe, William H. Epstein, Gerald S. Rosen, Bernard S. Leon, William G. Isgro and Jacob Frank ABSTRACT: A process for producing pharmaceutically valuable 5-substituted-1,4-benzodiazepines from 1,4-benzodiazepin-5-ones and intermediates therein.

//3,624,073

PROCESS FOR PREPARING 5-SUBSTITUTED-1,4-BENZODIAZEPINES

RELATED APPLICATIONS

This application is a continuation-in-part of Ser. No. 665,716, filed Sept. 6, 1967, now abandoned, inventors, George Francis Field, Leo Henryk Sternbach and William Joseph Zally.

SUMMARY OF THE INVENTION

In accordance with this invention, we have found that pharmaceutically valuable 5-substituted-1,4-benzodiazepines of the formula:

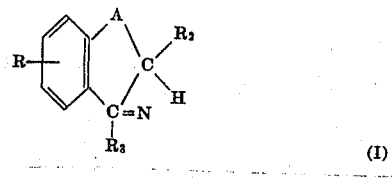

wherein A is selected from the group consisting of

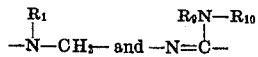

R is selected from the group consisting of hydrogen, halogen, nitro, trifluoromethyl, and lower alkyl; $R_1$ is selected from the group consisting of hydrogen, lower alkyl, lower alkenyl, and

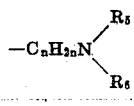

$R_2$, $R_5$ and $R_6$ are selected from the group consisting of hydrogen and lower alkyl; $R_3$ is selected from the group consisting of phenyl, lower alkyl substituted phenyl, and halo substituted phenyl; $R_9$ and $R_{10}$ are selected from the group consisting of hydrogen and lower alkyl; and $n$ is an integer from 1 to 6, can be prepared from 1,4-benzodiazepine-5-one compounds of the formula:

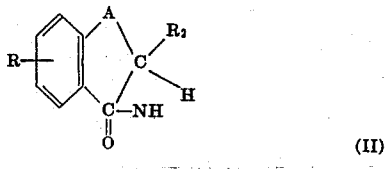

wherein A, R and $R_2$ are as above by first reacting a compound of the formula II above with a halogenating agent to produce a compound of the formula:

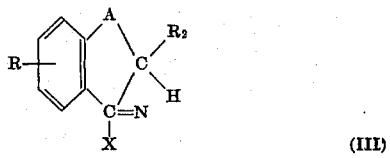

wherein A, R and $R_2$ are as above and X is halogen and thereafter reacting the compound of formula III above with an organometallic salt of a phenyl compound.

DETAILED DESCRIPTION OF THE INVENTION

As used herein, the term "lower alkyl" includes both straight and branched chain hydrocarbon radicals having from about one to about six carbon atoms such as methyl, ethyl, propyl, isopropyl, butyl, isobutyl, tertiary butyl and the like. The term "lower alkenyl" similarly connotes both straight and branched chain unsaturated hydrocarbon radicals having from about one to six carbon atoms, such as allyl, methyl-allyl and the like. The term "halogen" as used herein includes all four halogens, i.e., iodine, bromine, chlorine and fluorine. In accordance with an embodiment of this invention, R, which is a substituent in the 7-position, is a halogen, preferably chlorine. In accordance with the preferred embodiment in this invention, $R_1$ is either hydrogen or a lower alkyl group, such as methyl or ethyl. In accordance with the preferred embodiment of this invention, $R_3$ is phenyl. When $R_3$ is halophenyl, the preferred halogens are chlorine and fluorine. When $R_1$ contains the grouping $—C_nH_{2n}—$, this grouping represents a straight or branched chain alkyl group containing two or more carbon atoms. In a preferred aspect in this invention, $n$ is either 2 or 3.

In accordance with the preferred aspect of this invention, $R_2$ is hydrogen. When $R_2$ is lower alkyl, the preferred alkyl groups are methyl and ethyl. When $R_5$ and $R_6$ are alkyl groups, the preferred alkyl groups are methyl and ethyl.

In accordance with an embodiment of this invention, $R_9$ and $R_{10}$ represent one hydrogen and one lower alkyl group. In a preferred aspect of this invention, when $R_9$ or $R_{10}$ is lower alkyl, the preferred lower alkyl groups are methyl and ethyl. The methyl group is most preferred when $R_9$ or $R_{10}$ is lower alkyl.

The compound of formula II above, when A is $—N(R_1)—CH_2—$ is prepared by reacting a compound of the formula:

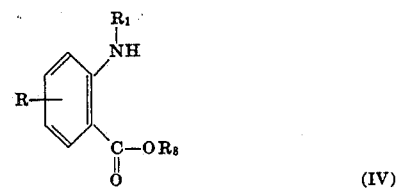

wherein R and $R_1$ are as above, and $R_8$ is hydrogen or lower alkyl with 2-haloethyleneamine having the formula:

wherein $R_2$ is as above and X is a halogen to first form a compound of the formula:

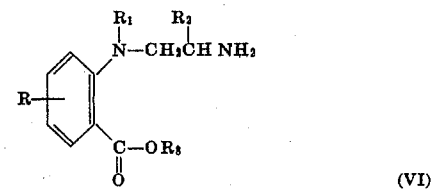

wherein R, $R_1$, $R_2$ and $R_8$ are as above.

The compounds of formula VI above are cyclized to form compounds of formula II above where A is $—N(R_1)—CH_2—$ by reacting compounds of formula VI above with a dehydrating agent.

The reaction of compounds of formula IV above with compounds of formula V above to produce a compound of formula VI above is carried out in an aqueous medium. This reaction generally takes places in the presence of an acid acceptor. Any conventional acid acceptor can be utilized in carrying out this reaction. Typical acid acceptors which can be utilized in accordance with this invention include sodium hydroxide, calcium hydroxide, potassium hydroxide, calcium carbonate, triethylamine, etc. Generally, in carrying out this reaction, it is preferred to utilize temperatures as high as the reflux temperature of the reaction medium. However, if desired, temperatures as low as 50° C. can be utilized.

When $R_2$ in formula VI above is hydrogen, compounds of formula VI can be prepared from compounds of formula IV by an alternate procedure. This procedure involves treating the compound of formula IV above with ethyleneimine in the presence of an aprotic Lewis acid such as, for example, boron trifluoride, titanium tetrachloride, aluminum chloride, and the like (preferably aluminum chloride) and an inert organic solvent, for example, a hydrocarbon such as benzene, toluene, and the like, followed by treatment with an acid hydrolyzing agent. Any conventional acid hydrolyzing agent can be utilized in this reaction. Among the preferred acid hydrolyzing agents are included sulfuric acid and hydrochloric acid. In carrying out this reaction, temperature and pressure are not critical. Therefore, this reaction can be carried out at room temperature and atmospheric pressure or at elevated temperatures and pressures.

The cyclization of compounds of formula VI to produce compounds of formula II above where A is —$N(R_1)$—$CH_2$— is carried out by dehydration. Any conventional dehydration technique can be utilized to dehydrate the compounds of formula VI above. A typical means for dehydrating the compound of formula VI above is by subjecting the compound of formula VI above to a dehydrating agent in the presence of an organic solvent. Any conventional dehydrating agent such as thionyl chloride, acetic anhydride, phosphorus pentoxide, etc., can be utilized in accordance with this invention. The dehydration reaction can be carried out at room temperature and the dehydration of compounds of formula VI above in the presence of a dehydrating agent will proceed slowly. Since the dehydration reaction can be accelerated by heating, it is generally preferred to carry out the dehydration reaction at elevated temperatures, preferably about the reflux temperature of the solvent.

Among the compounds of formula II above wherein A is —$N(R_1)$—$CH_2$— that are produced by the aforementioned dehydration of compounds of formula VI above are compounds having the formula:

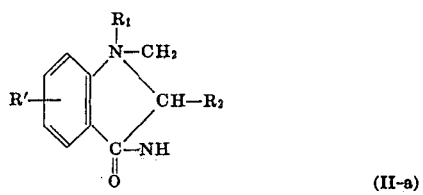

(II-a)

wherein R' is halogen, trifluoromethyl, nitro and lower alkyl; and $R_1$ and $R_2$ are as above.

The compound of formula II above wherein A is —N C[$N(R_9)$—$(R_{10})$]— is prepared by reacting a compound of the formula:

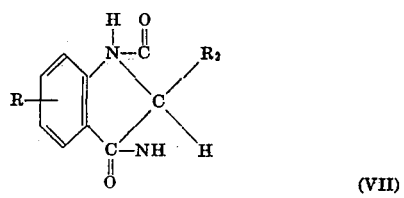

(VII)

wherein R and $R_2$ are as above with an amine having a formula:

(VIII)

wherein $R_9$ and $R_{10}$ are as above in the presence of an acid catalyst to form a compound of the formula:

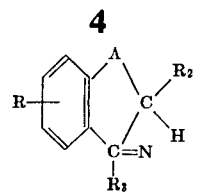

wherein R, $R_2$, $R_9$ and $R_{10}$ are as above.

The preferred organic amines corresponding to formula VIII which are utilized in carrying out the above reaction are primary amines such as methylamine, ethylamine, isopropylamine, propylamine, butylamine, etc. A most preferred organic amine for this purpose is methylamine. While it is preferred to utilize primary amines in carrying out the aforesaid reaction, secondary amines can be utilized as well as the aforementioned primary amines. Any conventional lower alkyl secondary amine can be utilized in accordance with this invention. Among the conventional secondary amines which can be utilized are included diethylamine, dimethylamine, N,N-propylbutylamine, etc.

The 1,4-benzodiazepin-2,5 diones of the formula VII above can be converted to the 2-amino or substituted amino-1,4-benzodiazepin-5-ones of the formula II-b above by treatment with any of the aforementioned primary or secondary lower alkyl amines, in the presence of an acid catalyst. In carrying out this reaction any conventional acid catalyst can be utilized. Typical acid catalysts which may be utilized in carrying out this reaction include p-toluene sulfonic acid and titanium tetrachloride, among others. The conversion of the compounds of the formula VII above into compounds of the formula II-b above is carried out in the presence of an inert organic solvent. Any conventional inert organic solvent can be utilized in carrying out this reaction. Typical inert organic solvents which can be utilized in accordance with this invention include diethyl ether, tetrahydrofuran, benzene, hexane, pentane, ethylpropyl ether and mixtures thereof. In carrying out this reaction, temperature and pressure are not critical and this reaction can be effected at room temperature or below, and at atmospheric pressure or at elevated temperatures and/or elevated pressure. Generally, it is preferred to carry out this reaction at a temperature of from about 0° C. to about 25° C. While it is generally preferable to utilize these low temperatures, temperatures as high as the reflux temperature of the solvent can be utilized.

Compounds of formula II are converted to compounds of formula III by treating the compounds of formula II above with a halogenating agent. Any conventional halogenating agent can be utilized to convert the compound of formula II above to compounds of formula III above. Among the conventional halogenating agents which can be utilized in accordance with this invention are phosphorus oxychloride, thionyl chloride, etc. Any of the conventional chlorinating techniques can be utilized in converting the compounds of formula II above to the compounds of formula III above.

The reaction whereby the compounds of formula III above are converted into the compounds of formula I above is carried out by simply adding an organometallic salt of a cyclic compound to the compound of formula III above. This reaction should be carried out in an inert organic solvent at a temperature of from about —60° C. to about 35° C. While temperatures above room temperature or 35° C. or temperatures below =60° C. can be utilized, it is seldom advisable to utilize these extreme temperatures due to the fact that the use of these temperatures is not economical and no additional beneficial results are achieved thereby. Any conventional inert organic solvent can be utilized as the reaction medium in accordance with this invention. Included among the solvents suitable for the purpose of the present invention are hydrocarbons such as benzene, toluene, xylene and the like; chlorinated hydrocarbons, such as chlorobenzene, and the like; ethers, such as tetrahydrofuran, diethyl ether, dioxane, and the like; or any other suitable solvent.

In accordance with this invention, the organometallic compound which is utilized to phenylate the compound of formula III above can be any organometallic compound of a cyclic compound such as phenyl, monoalkyl-phenyl or monohalogen-substituted phenyl radical. Any conventional metallic phenyl compounds can be utilized in accordance with this invention. Typical metallic phenyl compounds include the Grignard salts, lithium salts, sodium salts, etc. Among the many organometallic phenyl compounds which can be utilized to prepare phenyl-substituted compounds of formula I above included phenyl magnesium iodide, phenyl lithium, chlorophenyl lithium, etc.

The following examples are illustrative of the invention but not limitative thereof. All temperatures are stated in degrees Centigrade.

EXAMPLE 1

Preparation of 4-acetyl-7-chloro-1,2,3,4-tetrahydro-1-methyl-5H-1,4-benzodiazepin-5-one A mixture of 68.5 g. (0.37 mole) of 5-chloro-N-methyl-anthranilic acid, 51 g. (0.51 mole) of calcium carbonate, 76 g. (0.37 mole) of bromoethylamine hydrobromide and 2.5 liters of water was stirred and heated under reflux for 3 hours. A solution of 23.4 g. (0.26 mole) of anhydrous oxalic acid in 250 ml. of water was slowly added to the refluxing mixture. The precipitated calcium oxalate was filtered off, and the filtrate adjusted to pH 7 with concentrated ammonium hydroxide. The filtrate was then concentrated to dryness in vacuo and the residue heated on the steam bath with 400 ml. of 6N ethanolic hydrogen chloride until the residue was crystalline. Filtration gave 122 g. of N-(aminoethyl)-5-chloro-N-methylanthranilic acid hydrochloride as a solid.

A mixture of 100 g. of this solid and 1 liter of acetic anhydride was stirred and heated under reflux for 1.5 hours and then allowed to stand for 18 hours at room temperature. The excess acetic anhydride was removed in vacuo, and the residue was treated with 1 liter of water and ice and sufficient sodium bicarbonate to make neutral. The solid was collected, sucked dry on the filter, and triturated with hot ethanol. The ethanol solution on cooling gave 30.8 g. of 4-acetyl-7-chloro-1,2,3,4-tetrahydro-1-methyl-5H-1,4-benzodiazepin-5-one.

EXAMPLE 2

Preparation of 7-chloro-1,2,3,4-tetrahydro-1-methyl- 5H-1,4-benzodiazepin-5-one

A mixture of 25.25 g. (0.1 mole) of 4-acetyl-7-chloro-1,2,3,4-tetrahydro-1-methyl-5H-1,4-benzodiazepin-5-one, 33.3 ml. (0.1 mole) of 3N sodium hydroxide and 350 ml. of ethanol was heated under reflux for 15 minutes and then concentrated to dryness in vacuo. The residue was treated with 500 ml. of water, collected and washed with ethanol to give 20.2 g. of 7-chloro-1,2,3,4-tetrahydro-1-methyl-5H-1,4-benzodiazepin-5-one.

EXAMPLE 3

Preparation of 7-chloro-2,3-dihydro-1-methyl-5-phenyl-1H-1,4-benzodiazepine

A mixture of 4.7 g. (22.6 mole) of 7-chloro-1,2,3,4-tetrahydro-1-methyl-5H-1,4-benzodiazepin-5-one and 100 ml. of phosphorous oxychloride was heated in an oil bath at 100° C. for 15 minutes. The solution was concentrated to dryness in vacuo. The residue was partitioned between methylene chloride and cold saturated sodium bicarbonate solution. The methylene chloride phase was dried over sodium sulfate and sodium bicarbonate, filtered, diluted with benzene and concentrated in vacuo to produce crude 5,7-dichloro-2,3-dihydro-1-methyl-1H-1,4-benzodiazepine. The residue was dissolved in 75 ml. of tetrahydrofuran, treated with charcoal, and sodium sulfate and filtered. This solution was added to a solution in 250 ml. of tetrahydrofuran of phenyl magnesium bromide prepared from 17.7 ml. (0.17 mole) of bromobenzene. This mixture was stirred and heated under reflux for 1 hour. It was then cooled and diluted with 400 ml. of ether and sufficient 3N hydrochloric acid to make acid. The aqueous phase was separated, adjusted to pH 8 with 3N sodium hydroxide and extracted three times with 200 ml. of ether. The ether extracts were combined, washed with water and dried over sodium sulfate. The residue left on removal of the ether in vacuo was crystallized from petroleum ether to give 3.3 g. of 7-chloro-2,3-dihydro-1-methyl-5-phenyl-1H-1,4-benzodiazepine.

EXAMPLE 4

Preparation of 4-acetyl-1,2,3,4-tetrahydro-1-methyl-5H-1,4-benzodiazepin-5-one

A mixture of 100 g. (0.66 mole) of N-methylanthranilic acid, 91 g. (0.91 mole) of calcium carbonate, 135.8 g. (0.66 mole) of bromoethylamine hydrobromide and 3.0 liter of water was stirred and heated under reflux for four hours. A solution of 59.6 g. (0.662 mole) of anhydrous oxalic acid in 600 ml. of water was slowly added to the refluxing mixture. The precipitated calcium oxalate was filtered off, and the filtrate adjusted to pH 7 with concentrated ammonium hydroxide. The filtrate was then concentrated to dryness in vacuo and the residue treated with 450 ml. of 6N ethanolic hydrogen chloride and 300 ml. of ether. Filtration gave N-(aminoethyl)-N-methyl-anthranilic acid hydrochloride as a solid.

A mixture of 108.6 g. of this solid and 1 liter of acetic anhydride was stirred and heated under reflux for 1 hour. The excess acetic anhydride was removed in vacuo, and the residue was treated with 1 liter of water and ice and sufficient sodium bicarbonate to make neutral. The solid was collected to give 58 g. of 4-acetyl-1,2,3,4-tetrahydro-1-methyl-5H-1,4-benzodiazepin-5-one.

EXAMPLE 5

Preparation of 1,2,3,4-tetrahydro-1-methyl-5H-1,4-benzodiazepin-5-one

A mixture of 1.7 g. (7.8 mMole) of 4-acetyl-1,2,3,4-tetrahydro-1-methyl-5H-1,4-benzodiazepin-5-one, 2.6 ml. (7.8 mMole) of 3N sodium hydroxide and 25 ml. of ethanol was heated under reflux for 15 minutes and then concentrated to dryness in vacuo. The residue was treated with water, collected to give 1.2 g. of 1,2,3,4-tetrahydro-1-methyl-5H-1,4-benzodiazepin-5-one.

EXAMPLE 6

Preparation of 2,3-dihydro-1-methyl-5-phenyl-1H-1,4-benzodiazepine

A mixture of 4.0 g. (22 mMoles) of 1,2,3,4,-tetrahydro-1-methyl-5H-1,4-benzodiazepin-5-one and 100 ml. of phosphorous oxychloride was heated in an oil bath at 100° C. for one-quarter hour. The solution was concentrated to dryness in vacuo. The residue was partitioned between methylene chloride and cold-saturated sodium bicarbonate solution. The methylene chloride phase was dried over sodium sulfate, filtered and concentrated in vacuo. The residue was dissolved in ether and the solution filtered through a plug of alumina using more ether to wash the plug until all of the yellow color had been removed. The ethereal eluates were combined and concentrated in vacuo to give 4.1 g. of yellow oil which was 5-chloro-2,3-dihydro-1-methyl-1H-1,4-benzodiazepine. This oil was dissolved in 50 ml. of tetrahydrofuran and added slowly to a solution of phenyl magnesium bromide prepared from 17.7 ml. (0.17 mole) of bromobenzene in 250 ml. of tetrahydrofuran. This solution was stirred and heated under reflux for 1 hour. It was then cooled and diluted with ether and 3N hydrochloric acid until the aqueous phase was acidic. The aqueous phase was separated, made alkaline with 3N sodium hydroxide and extracted with ether. The ether was dried, filtered and concentrated in vacuo to leave a reddish oil. This oil was dissolved in ether and the solution was saturated with hydrogen chloride and the mixture was allowed to stand for 2 days at room temperature. The ether was decanted from a heavy oil, and this oil was treated with ether and dilute sodium hydroxide. The ether extract was dried, filtered and concentrated in vacuo to give 4.0 g. of oil. This oil was dissolved in hexane, and the solution poured through a plug of alumina. Ether was used to continue the elution. The hexane eluates were concentrated to dryness to give 1.3 g. of 2,3-dihydro-1-methyl-5-phenyl-1H-1,4-benzodiazepine. From the ether eluates a further 1.3 g. of the product was obtained.

EXAMPLE 7

Preparation of 7-Chloro-2-methylamino-5-phenyl-3H-1,4-benzodiazepine

A mixture of 4.5 g. (20 mMole) of 7-chloro-3,4-dihydro-2-methylamino-5H-1,4-benzodiazepin-5-one and 100 ml. of phosphorus oxychloride was heated under reflux overnight and concentrated in vacuo. Twice toluene was added to the residue and distilled out in vacuo. The residue was dissolved in 200 ml. of dry tetrahydrofuran and added during 15 minutes to a solution of phenyl magnesium bromide in 500 ml. of tetrahydrofuran prepared from 3.9 g. (0.16 mole) of magnesium and 17.7 ml. (0.17 mole) of bromobenzene. The reaction mixture was then stirred and heated under reflux for 4 hours. It was then cooled and diluted with methylene chloride and saturated sodium bicarbonate solution. Glacial acetic acid was added until the precipitate dissolved. The organic layer was separated, dried over sodium sulfate and concentrated in vacuo. The residue was crystallized from acetone to give the above titled product, m.p. 235°–240°. Recrystallization from acetone gave yellowish prisms, m.p. 242°–244°, undepressed on admixture with authentic material. Thin layer chromatography and infrared spectra also demonstrated identity with authentic material.

The above starting material can be prepared by cooling a suspension of 8.4 g. (40 mMole) of 7-chloro-1,3-dihydro-2H-1,4-benzodiazepin-2,5(4H)-dione in 1.5 liters of tetrahydrofuran to 10° and bubbling in methylamine for one-quarter hour. During 15 minutes a solution of 6 ml. (46 mMole) of titanium tetrachloride in 100 ml. of benzene was added to the stirred suspension held at 10°. The reaction mixture was then heated under reflux for 2 hours. After it had been cooled, 60 ml. of ice water was added, and the precipitate filtered off. The filtrate was dried over sodium sulfate and concentrated in vacuo. The residue was treated with tetrahydrofuran and petroleum ether to give 7-chloro-3,4-dihydro-2-methylamino-5H-1,4-benzodiazepin-5-one, m.p. 225°–230°. Recrystallization from methanol gave colorless prisms, m.p. 246°–249° (dec).

We claim:

1. A process for preparing a 5-substituted benzodiazepine compound of the formula:

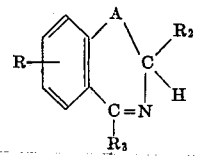

wherein A is selected from the group consisting

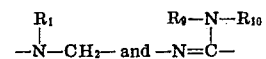

of; R is selected from the group consisting of hydrogen, halogen, nitro, trifluoromethyl, and lower alkyl; $R_1$ is selected from the group consisting of hydrogen, lower alkyl, lower alkenyl,

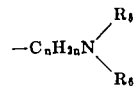

and; $R_2$, $R_5$ and $R_6$ are selected from the group consisting of hydrogen and lower alkyl; $R_3$ is selected from the group consisting of phenyl, lower alkyl substituted phenyl and halo substituted phenyl; $R_9$ and $R_{10}$ are selected from the group consisting of hydrogen and lower alkyl; and $n$ is an integer from one to 6 from a 5-halo substituted benzodiazepine compound of the formula:

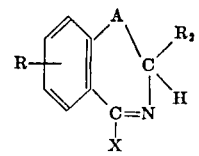

wherein A, R and $R_2$ are as above and X is halogen comprising reacting said 5-halo substituted benzodiazepine in the presence of an inert organic solvent with an organometallic salt selected from the group consisting of compounds of the formula $$R_3—M$$

wherein $R_3$ is as above and M is an alkali metal or the group —MgX wherein X is as above at a temperature in the range of from −60° C. to the reflux temperature of the reaction medium.

2. The process of claim 1 wherein said organometallic salt compound is phenyl lithium.

3. The process of claim 1 wherein said organometallic salt compound is phenyl magnesium bromide.

* * * * *

PO-1050
(5/69)

UNITED STATES PATENT OFFICE
CERTIFICATE OF CORRECTION

Patent No. 3,624,073      Dated November 30, 1971

Inventor(s) Field, Sternbach and Zally

It is certified that error appears in the above-identified patent and that said Letters Patent are hereby corrected as shown below:

Column 8, lines 1-29    of Claim 1

- entire wherein clause should be indented -

Column 8, line 1

"wherein A is selected from the group consisting"

should be wherein A is selected from the group consisting of

Column 8, line 10 delete "of"

Column 8, line 13

"lower alkyl, lower alkenyl"

should be lower alkyl, lower alkenyl and

Column 8, line 24 delete "and"

Column 8, line 29

"one to 6"

should be 1 to 6

PO-1050
(5/69)

UNITED STATES PATENT OFFICE
CERTIFICATE OF CORRECTION

Patent No. 3,624,073        Dated _____

Inventor(s) _____

It is certified that error appears in the above-identified patent and that said Letters Patent are hereby corrected as shown below:

Column 8, line 30 - should start at the margin with  <u>from a 5-halo substituted benzodiazepine compound of the formula</u>

Column 8, line 43 indent <u>wherein</u> clause

Column 8, line 44 should start at the margin with  <u>comprising reacting, etc.</u>

Signed and sealed this 23rd day of May 1972.

(SEAL)
Attest:

EDWARD M. FLETCHER, JR.         ROBERT GOTTSCHALK
Attesting Officer               Commissioner of Patents